United States Patent
Cai et al.

(10) Patent No.: US 11,414,071 B2
(45) Date of Patent: Aug. 16, 2022

(54) METHOD AND APPARATUS FOR CONTROLLING VEHICLE, AND STORAGE MEDIUM

(71) Applicant: BEIJING BAIDU NETCOM SCIENCE AND TECHNOLOGY CO., LTD, Beijing (CN)

(72) Inventors: Jiakun Cai, Beijing (CN); Bin Huang, Beijing (CN); Ke Tang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/221,238

(22) Filed: Apr. 2, 2021

(65) Prior Publication Data
US 2021/0221360 A1    Jul. 22, 2021

(30) Foreign Application Priority Data

Jun. 30, 2020 (CN) .......................... 202010616910.8

(51) Int. Cl.
*B60W 30/06* (2006.01)
*G08G 1/16* (2006.01)
*G06V 20/58* (2022.01)

(52) U.S. Cl.
CPC .............. *B60W 30/06* (2013.01); *G06V 20/58* (2022.01); *G06V 20/586* (2022.01); *G08G 1/168* (2013.01)

(58) Field of Classification Search
CPC ..... B60W 30/06; G06V 20/58; G06V 20/586; G08G 1/168; B62D 15/0285
See application file for complete search history.

(56) References Cited

U.S. PATENT DOCUMENTS

| | | | |
|---|---|---|---|
| 10,957,198 B1 * | 3/2021 | Hao | G08G 1/14 |
| 2017/0096102 A1 * | 4/2017 | Nallapa | B60Q 9/006 |
| 2018/0111609 A1 * | 4/2018 | Woo | G06V 20/586 |
| 2018/0357906 A1 | 12/2018 | Yaldo et al. | |
| 2019/0232952 A1 * | 8/2019 | Kim | G08G 1/143 |
| 2020/0055522 A1 * | 2/2020 | Kasai | B60W 50/0225 |

(Continued)

FOREIGN PATENT DOCUMENTS

| | | |
|---|---|---|
| CN | 107886080 A | 4/2018 |
| CN | 108016497 A | 5/2018 |

(Continued)

OTHER PUBLICATIONS

Office Action for Chinese Application No. 202010616910.8, dated Apr. 13, 2021, 9 pages.

(Continued)

*Primary Examiner* — Munear T Akki
(74) *Attorney, Agent, or Firm* — Fay Sharpe (57) ABSTRACT

A method and an apparatus for controlling a vehicle and a storage medium are disclosed. The method includes: controlling a vehicle to drive into a first parking space, the first parking space being a target parking space determined to be in an idle state; controlling the vehicle to stop driving into the first parking space in response to determining that the vehicle fails to drive into the first parking space while the vehicle is controlled to drive into the first parking space; determining a second parking space as the target parking space automatically; and controlling the vehicle to drive into the second parking space.

20 Claims, 5 Drawing Sheets

(56) References Cited

U.S. PATENT DOCUMENTS

| | | | | |
|---|---|---|---|---|
| 2020/0361462 A1* | 11/2020 | Noguchi | ............... | G08G 1/22 |
| 2020/0361489 A1* | 11/2020 | Park | ............... | B60W 50/0097 |
| 2021/0261124 A1* | 8/2021 | Niewiadomski | .. | B60W 50/0097 |
| 2021/0291814 A1* | 9/2021 | Shirozono | ........ | B62D 15/0285 |
| 2021/0380096 A1* | 12/2021 | Katoh | ................ | G08G 1/09 |

FOREIGN PATENT DOCUMENTS

| | | |
|---|---|---|
| CN | 109087524 A | 12/2018 |
| CN | 110065490 A | 7/2019 |
| CN | 110588638 A | 12/2019 |
| CN | 110738867 A | 1/2020 |
| CN | 111137280 A | 5/2020 |
| JP | 2010208359 A | 9/2010 |
| JP | 2019153226 A | 9/2019 |
| WO | 2019123585 A1 | 6/2019 |

OTHER PUBLICATIONS

Extended European Search Report for Application No. 21158996.5, dated Aug. 11, 2021, 8 pages.
Office Action for Chinese Application No. 202010616910.8, dated Sep. 16, 2021, 13 pages.
Office Action for Japanese Application No. 2021-019417, dated Feb. 15, 2022, 7 pages.

* cited by examiner

METHOD AND APPARATUS FOR CONTROLLING VEHICLE, AND STORAGE MEDIUM

CROSS-REFERENCE TO RELATED APPLICATION

The present application is based upon and claims priority to Chinese Patent Application No. 202010616910.8, filed on Jun. 30, 2020, the entire contents of which are incorporated herein by reference.

TECHNICAL FIELD

The present disclosure relates to a field of data/image processing, and more particularly to a field of automatic driving technologies.

BACKGROUND

With development of automatic driving technologies, more and more aspects for controlling vehicle driving are completed by the automatic driving technologies. Autonomous parking is one of the concerned aspects. In the autonomous parking technologies, the vehicle may be driven into a parking space and stopped in the parking space by various environment sensors and a logic of the vehicle without control of a driver. In actual practice, a complex environment may be faced when the vehicle is parked autonomously. Parking effect in the complex environment is an important consideration for a performance of the autonomous parking.

SUMMARY

According to a first aspect of the present disclosure, a method for controlling a vehicle is provided. The method includes: controlling a vehicle to drive into a first parking space, the first parking space being a target parking space determined to be in an idle state; controlling the vehicle to stop driving into the first parking space in response to determining that the vehicle fails to drive into the first parking space while the vehicle is controlled to drive into the first parking space; determining a second parking space as the target parking space automatically; and controlling the vehicle to drive into the second parking space.

According to a second aspect of the present disclosure, an apparatus for controlling a vehicle is provided. The apparatus may include at least one processor and a memory communicatively coupled to the at least one processor. The at least one processor is configured to: control a vehicle to drive into a first parking space, the first parking space being a target parking space determined to be in an idle state; control the vehicle to stop driving into the first parking space in response to determining that the vehicle fails to drive into the first parking space; determine a second parking space as the target parking space automatically; and control the vehicle to drive into the second parking space.

According to a third aspect of the present disclosure, a non-transitory computer readable storage medium having computer instructions stored thereon is provided. The computer instructions are configured to enable a computer to execute a method for controlling a vehicle. The method may include: controlling a vehicle to drive into a first parking space, the first parking space being a target parking space determined to be in an idle state; controlling the vehicle to stop driving into the first parking space in response to determining that the vehicle fails to drive into the first parking space while the vehicle is controlled to drive into the first parking space; determining a second parking space as the target parking space automatically; and controlling the vehicle to drive into the second parking space.

It should be understood that, descriptions in Summary of the present disclosure does not aim to limit a key or important feature in embodiments of the present disclosure, and does not used to limit the scope of the present disclosure. Other features of the present disclosure will be easily understood by following descriptions.

BRIEF DESCRIPTION OF THE DRAWINGS

The accompanying drawings are used for better understanding the solution and do not constitute a limitation of the present disclosure. In the accompanying drawings.

DETAILED DESCRIPTION

Description will be made below to exemplary embodiments of the present disclosure with reference to accompanying drawings, which includes various details of embodiments of the present disclosure to facilitate understanding and should be regarded as merely examples. Therefore, it should be recognized by the skilled in the art that various changes and modifications may be made to the embodiments described herein without departing from the scope and spirit of the present disclosure. Meanwhile, for clarity and conciseness, descriptions for well-known functions and structures are omitted in the following description.

In the actual practice of automatic driving, a complex environment may be faced when a vehicle is parked autonomously. For example, the vehicle may encounter an obstacle when driving into a parking space. When the vehicle encounters the obstacle and it is determined that there is no moving room that allows the vehicle to successfully drive into the parking space, a conventional autonomous parking logic may determine that the parking fails, and the vehicle parks in its original position and exits the autonomous parking procedure. Such conventional autonomous parking process is only aimed at a specific parking space, and it fails to find there is a need for users to autonomously park to a new parking space, thereby resulting in poor parking effect.

In order to at least solve the above problems, embodiments of the present disclosure provide an improved solution for controlling a vehicle. According to embodiments, the vehicle is controlled to drive into a first parking space.

The first parking space is a target parking space determined to be in an idle state. The vehicle is controlled to stop driving into the first parking space in response to determining that the vehicle fails to drive into the first parking space while the vehicle is controlled to drive into the first parking space. A second parking space is determined as the target parking space automatically. The vehicle is controlled to drive into the second parking space. In this case, when the vehicle fails to drive into the parking space due to encountering the obstacle during driving into the parking space, another parking space may be automatically determined, thereby realizing automatic parking again. In this way, the vehicle may be parked autonomously to an appropriate parking space, to ensure the effect of the autonomous parking.

Various exemplary embodiments of the present disclosure will be described in detail below with reference to various embodiments in conjunction with accompanying drawings.

Figure 1:
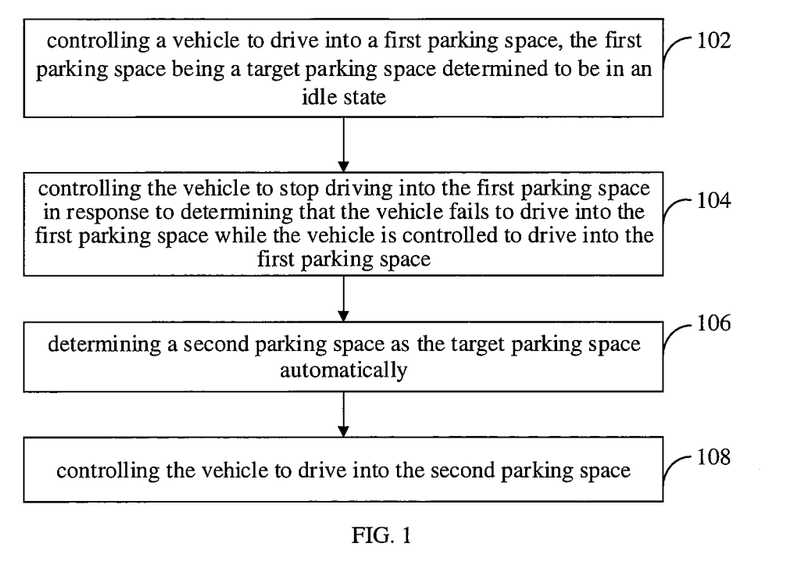
FIG. 1 is a flow chart illustrating a method for controlling a vehicle according to a first embodiment of the present disclosure.

FIG. 1 is a flow chart illustrating a method 100 for controlling a vehicle according to embodiments of the present disclosure.

At block 102, the vehicle is controlled to drive into a first parking space. The first parking space is a target parking space determined to be in an idle state.

In some embodiments, after it is determined that the first parking space is in the idle state, the vehicle is controlled to drive into the first parking space based on an into-garage driving mode. The into-garage driving mode may be any known automatic driving mode that controls the vehicle to drive into the parking space.

It should be understood that, the idle state described herein refers to a state where the parking space is not occupied by the vehicle, and the idle state corresponding to the controlled vehicle, that is, the idle state of the parking space where the controlled vehicle may be parked, may be identified based on a conventional logic.

At block 104, the vehicle is controlled to stop driving into the first parking space in response to determining that the vehicle fails to drive into the first parking space while the vehicle is controlled to drive into the first parking space.

In some embodiments, it is determined whether there is an obstacle within a predetermined range of the vehicle while the vehicle is controlled to drive into the first parking space. It is determined whether there is a moving room that allows the vehicle to avoid the obstacle and drive into the first parking space in response to determining that the obstacle exists. It is determined that the vehicle may not drive into the first packing space successfully in response to determining that there is no moving room. The vehicle is controlled to stop driving into the first packing space in response to determining that the vehicle may not drive into the first packing space successfully. In addition, the vehicle is controlled to drive away the first packing space in response to determining that the vehicle may not drive into the first packing space successfully.

In some embodiments, the vehicle is controlled to drive away the first packing space based on an out of-garage driving mode in response to determining that the vehicle fails to drive into the first packing space. The out of-garage driving mode may be any known automatic driving mode for controlling the vehicle to drive away the parking space.

At block 106, a second parking space is determined as the target parking space automatically.

In some embodiments, the second parking space is determined as the target parking space while the vehicle is controlled to drive away the first parking space. In some embodiments, when the second parking space is identified as being in the idle state, the second parking space is determined as a candidate parking space. After it is determined that the vehicle fails to drive into the first parking space, the second parking space in the candidate parking spaces is determined as the target parking space.

In some embodiments, a state of at least one parking space adjacent to the first parking space is identified while the vehicle is controlled to drive into the first parking space. It may be understood by the skilled in the art that, the "adjacency" to the first parking space refers a predetermined distance range of the first parking space. Generally, the predetermined distance range may be artificially specified or determined by a range that a sensor of the vehicle may sense. When the at least one parking space is in the idle state, the at least one parking space is determined as the at least one candidate parking space. In this way, when the vehicle is controlled to drive away the first parking space after it is determined that the vehicle fails to drive into the first parking space, the second parking space in the at least one candidate parking space is directly determined as the target parking space, so as to perform the autonomous parking process again. In this way, the vehicle may autonomously perform parking again to ensure the effect of the autonomous parking.

In another embodiment, a state of the second parking space adjacent to the first parking space is identified while the vehicle is controlled to drive away the first parking space and to drive along a lane. When the second parking space is in the idle state, the second parking space is determined as the target parking space. In this way, when the vehicle is controlled to drive away the first parking space and drive along the lane after it is determined that the vehicle fails to drive into the first parking space, the second parking space is identified and determined as the target parking space, so as to perform the autonomous parking vehicle process again. In this way, since the idle state of the second parking space is identified when the vehicle is basically parallel to the lane, the second parking space may be identified for parking again by the conventional logic for identifying the parking space, thereby ensuring the effect of the autonomous parking.

At block 108, the vehicle is controlled to drive into the second parking space.

In some embodiments, after the second parking space is determined as the target parking space, the vehicle is controlled to drive into the second parking space based on the into-garage driving mode. In this way, the vehicle may be parked in the second parking space, thereby completing autonomous parking and realizing the desired parking effect.

In some embodiments, while the vehicle is controlled to drive into the second parking space, it is determined whether there is an obstacle within the predetermined range of the vehicle. It is determined whether there is a moving room that allows the vehicle to avoid the obstacle and drive into the second parking space in response to determining that the obstacle exists. It is determined that the vehicle may not drive into the first packing space successfully in response to determining that there is no moving room. Then, another packing space may be identified and determined as the target packing space in the similar process with the above. In this way, after it is determined that the vehicle may not successfully drive into the previous target parking space, the target parking space is re-determined until the vehicle successfully drives into the parking space and completes the autonomous parking.

In some embodiments, when it is determined that all the parking spaces in a parking lot may not meet a parking requirement of the controlled vehicle, a warning message is issued to indicate the driver.

According to embodiments of the present disclosure, when the vehicle may not successfully be driven into the target parking space previously determined during the autonomous parking, another target parking space is automatically determined for re-parking. In this way, it is ensured that the vehicle may be parked in the parking space, thereby achieving a good effect of the autonomous parking.

Figure 2:
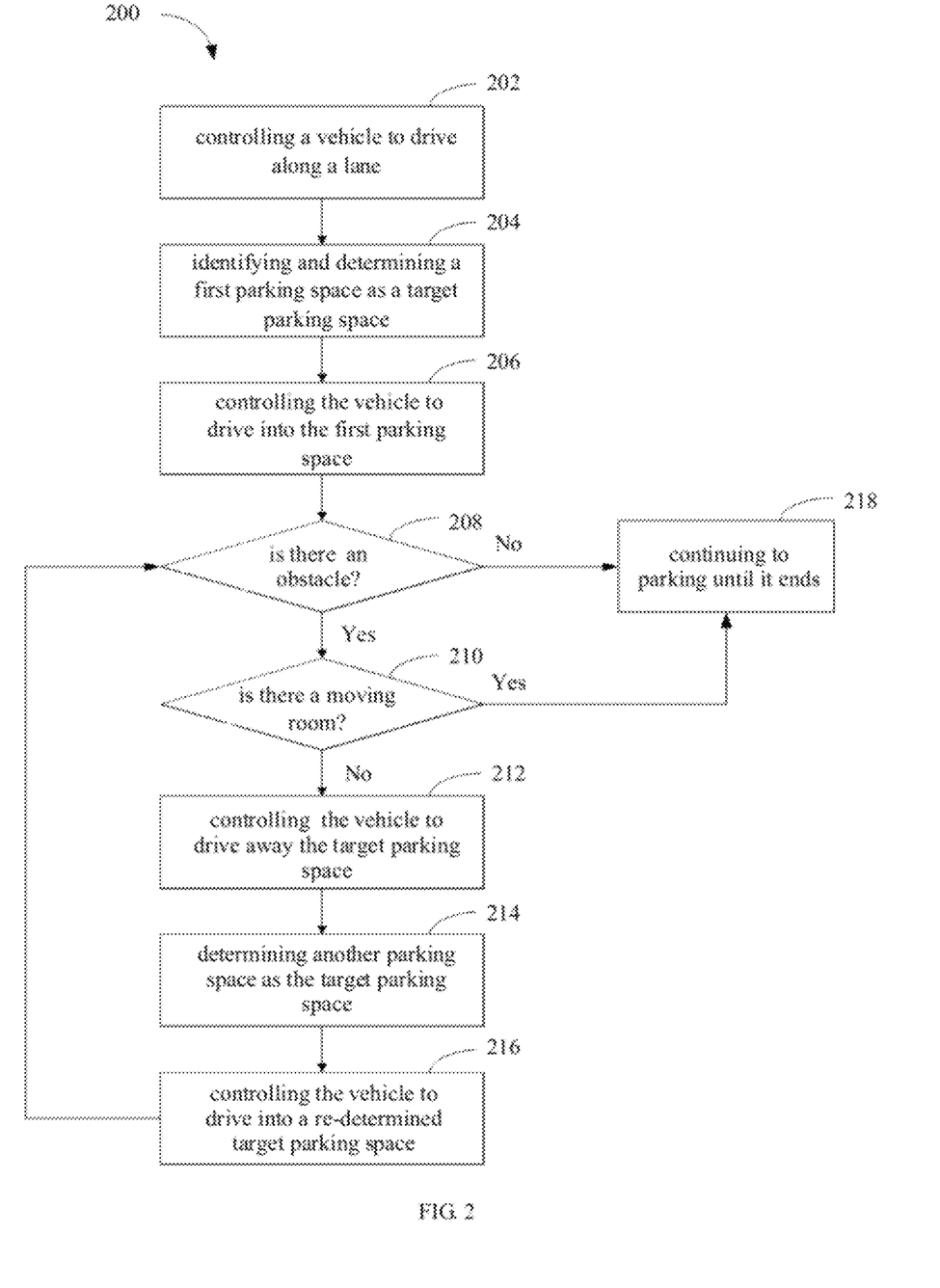
FIG. 2 is a flow chart illustrating a method for controlling a vehicle according to a second embodiment of the present disclosure.

FIG. 2 is a flow chart illustrating a method 200 for controlling a vehicle according to a second embodiment of the present disclosure. FIG. 3A-FIG. 3D are schematic diagrams illustrating various stages of the method for controlling the vehicle according to embodiments of the present disclosure. Descriptions will be made below to the method for controlling the vehicle according to embodiments of the present disclosure in conjunction with FIG. 2 and FIG. 3A-FIG. 3D.

Figure 3A:
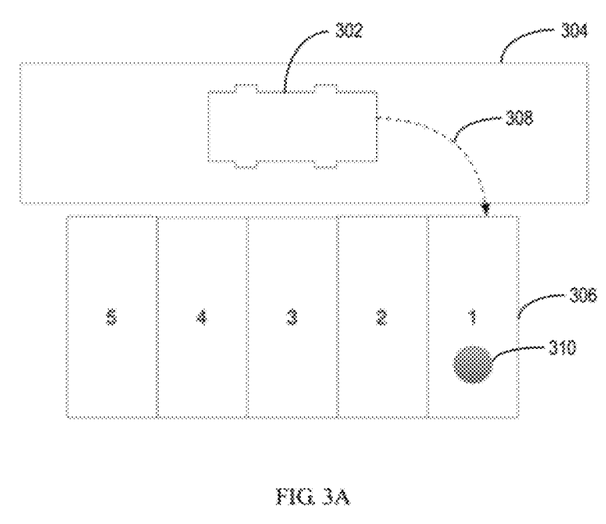
FIG. 3A-FIG. 3D are schematic diagrams illustrating multiple stages of the method for controlling the vehicle according to the second embodiment of the present disclosure.

At block 202, a vehicle 302 is controlled to drive along a lane 304, as illustrated in FIG. 3A. After an autonomous parking task is started, the vehicle 302 is controlled to drive along the lane 304 within a parking lot. In some embodiments, the vehicle 302 may travel in a direction substantially parallel to the lane 304.

At block 204, a first parking space 306(1) from multiple parking spaces 306 is identified and determined as a target parking space. A state of the first parking space 306(1) is identified while the vehicle 302 is driving along the lane 304. When the first parking space 306(1) is in an idle state, the first parking space 306(1) is determined as the target parking space. In this way, when the vehicle 302 travels along the lane 304, the idle state of multiple parking spaces 306 may be identified by a conventional logic. In this way, various conventional logics may be applied to reliably identify whether multiple parking spaces 306 are in the idle state in which the multiple parking spaces 306 are unoccupied by vehicles, so as to improve applicability and identification accuracy.

Multiple parking spaces 306 may include five parking spaces from a first parking space 306(1) (simply labeled as 1 in FIG. 3A-FIG. 3D) to a fifth parking space 306(5) (simply labeled as 5 in FIG. 3A-FIG. 3D), which may be collectively referred to as the parking space 306. It should be understood that the number of parking spaces is only exemplary, and the parking lot may include other number of parking spaces.

In some embodiments, when the state of the first parking space 306(1) is identified, the state of at least one parking space adjacent to the first parking space 306(1) is identified. The at least one parking space may include the second parking space 306(2) and the third parking space 306(3). When the at least one parking space is in the idle state, the at least one parking space is determined as at least one candidate parking space. In this way, when the vehicle starts to identify the parking space, multiple parking spaces are identified and determined as the candidate parking spaces by the way, thereby improving the efficiency At block 206, the vehicle 302 is controlled to drive into the first parking space 306(1). In some embodiments, the vehicle 302 is controlled to drive into the first parking space 306(1) along an into-garage path 308, as illustrated in FIG. 3A. In some embodiments, the vehicle 302 drives in parallel to the lane 304 when starting to drive along the into-garage path 308. In some embodiments, the vehicle 302 is driven in reverse along the into-garage path 308.

In some embodiments, while the vehicle 302 is controlled to drive into the first parking space 306(1), the state of the at least one parking space adjacent to the first parking space 306(1) is identified. The at least one parking space may include the second parking space 306(2) and the third parking space 306(3). When the at least one parking space is in the idle state, the at least one parking space is determined as the at least one candidate parking space. In this way, when the vehicle is controlled to drive into the parking space, the adjacent parking spaces are identified and determined as the candidate parking spaces by the way, thereby improving the efficiency.

In some embodiments, the state of the at least one parking space adjacent to the first parking space 306(1) is identified while the vehicle 302 is driven in reverse along the lane 304. In this way, when the vehicle is slowly driving, the adjacent parking spaces are identified and determined as the candidate parking spaces by the way, thereby improving the accuracy and efficiency.

Figure 3B:
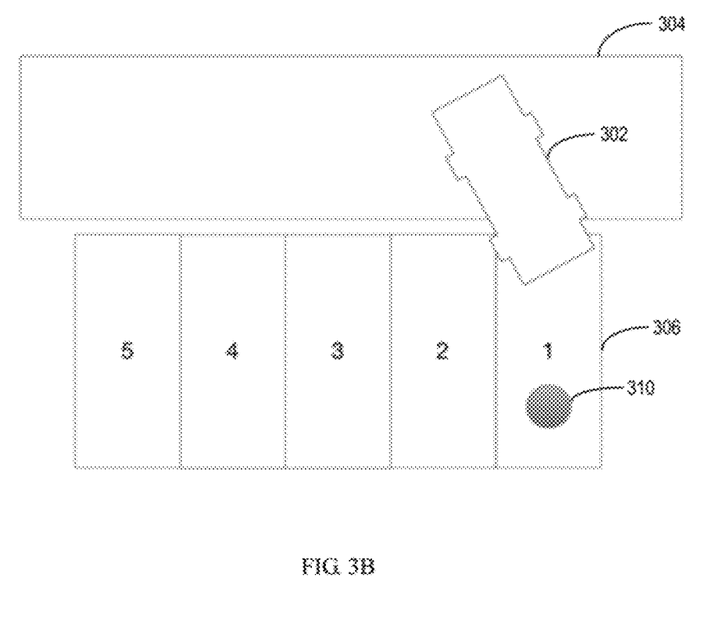

At block 208, while the vehicle 302 is controlled to drive into the first parking space 306(1), it is determined whether there is an obstacle 310 within a predetermined range of the vehicle 302, as illustrated in FIG. 3B. When it is determined that there is no obstacle ("No" at block 208), the process proceeds to block 218. When it is determined that there is the obstacle ("Yes" at block 208), the process proceeds to block 210. In this way, the obstacle may not be identified while the parking space in the idle state is identified, but may be identified at a close range, thereby adapting to a complex environment.

At block 210, it is determined whether there is moving room that allows the vehicle 302 to avoid the obstacle and drive into the first parking space 306(1). When it is determined that there is no moving room, it is determined that the vehicle 302 fails to drive into the first parking space 306(1), and the process proceeds to block 212. When it is determined that there is the moving room, the process proceeds to block 218. In this way, under the condition that the vehicle may avoid the obstacle and drive into the parking space, the vehicle may be controlled to continue driving, thereby improving the efficiency.

At block 212, the vehicle 302 is controlled to drive away the target parking space. In some embodiments, the vehicle 302 is controlled to drive away the first parking space 306(1) along an out of garage path 312, as illustrated in FIG. 3C.

In some embodiments, while the vehicle 302 is controlled to drive away the first parking space 306(1), environment information of the at least one candidate parking space is identified. In some embodiments, the environment information may include information associated with a predetermined scenario. In this way, the environment information adjacent to the candidate parking space may be identified from different angles at a close range, thereby increasing cognition for all aspects of the candidate parking space.

At block 214, another parking space is determined as the target parking space. In some embodiments, the second parking space 306(2) is automatically determined as the target parking space.

Figure 3C:
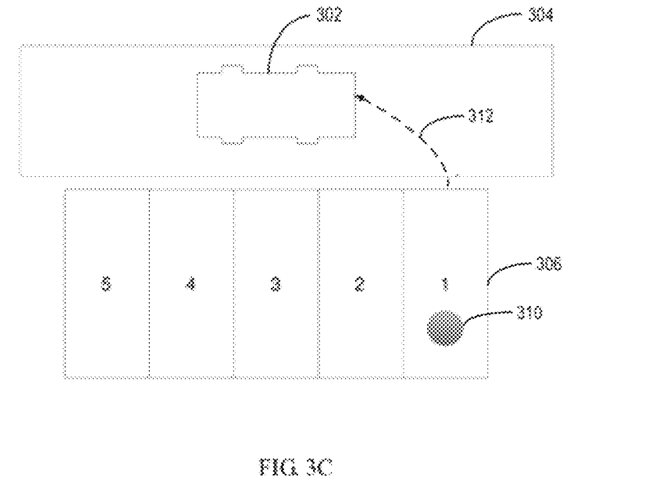
Figure 3D:
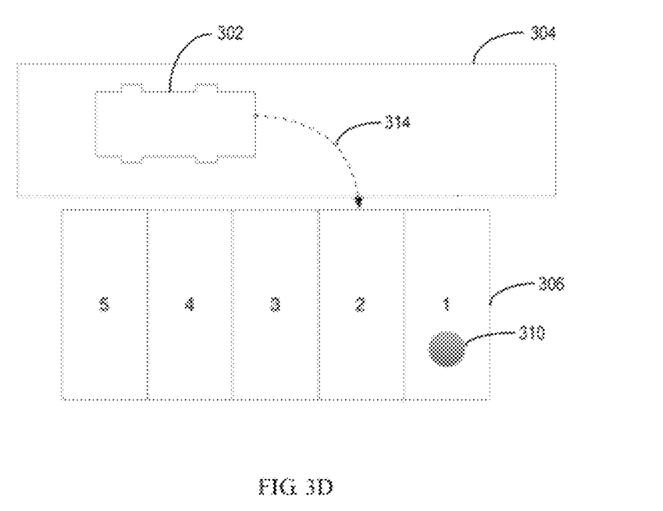

In some embodiments, as illustrated in FIG. 3C and FIG. 3D, when the vehicle 302 drives away the first parking space 306(1) and drives along the lane 304, a state of the second parking space 306(2) adjacent to the first parking space 306(1) is identified. When the second parking space 306(2) is in the idle state, the second parking space 306(2) is determined as the target parking space. In this way, since the vehicle is basically parallel to the lane, the identification environment of the second parking space is basically consistent with the identification environment where the first parking space is identified, such that various conventional logics may be applied to identify the state of the parking space to improve the applicability and identification accuracy.

In other embodiments, the second parking space 306(2) in the at least one candidate parking space is determined as the target parking space. In this way, after it is determined that the vehicle fails to drive into the target parking space, a new target parking space is directly determined, thereby improving the parking speed and efficiency.

In other embodiments, the second parking space 306(2) in the at least one candidate parking space is determined as the target parking space based on the environmental information. In this way, after it is further confirmed whether the environment information of the at least one candidate parking space meets a predetermined standard, the new target parking space is directly determined, thereby improving the parking velocity, efficiency and parking success rate.

At block 216, the vehicle 302 is controlled to drive into a re-determined target parking space. In some embodiments, the vehicle 302 is controlled to drive into the second parking space 306(2) along the into-garage path 314, as illustrated in FIG. 3D. In some embodiments, the vehicle 302 is driven in reverse along the into-garage path 314. In some embodiments, the vehicle 302 drives in parallel to the lane 304 when starting to drive along the into-garage path 314.

The process is returned to block 208 to determine whether there is a obstacle within the predetermined range of the vehicle 302 while the vehicle 302 is controlled to drive into the re-determined target parking space. Then, in a similar manner as described above, the process proceeds to block 210, block 212, block 214 and block 216, such that the vehicle 302 is parked in the parking space.

At block 218, when it is determined that there is no obstacle, or determined that there is the moving room, the vehicle 302 is controlled to continue parking to the target parking space until the process ends.

Figure 4:
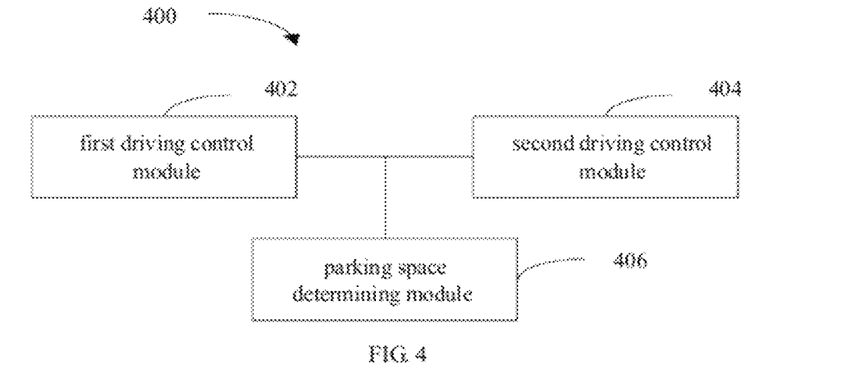
FIG. 4 is a block diagram illustrating an apparatus for controlling a vehicle according to a third embodiment of the present disclosure.

According to embodiments of the present disclosure, an apparatus for controlling a vehicle is also provided. FIG. 4 is a block diagram illustrating an apparatus 400 for controlling a vehicle according to a third embodiment of the present disclosure. As illustrated in FIG. 4, the apparatus 400 includes: a first driving control module 402, a second driving control module 404, and a parking space determining module 406.

The first driving control module 402 is configured to control a vehicle to drive into a first parking space. The first parking space is a target parking space determined to be in an idle state.

The second driving control module 404 is configured to control the vehicle to stop driving into the first parking space in response to determining that the vehicle fails to drive into the first parking space while the vehicle is controlled to drive into the first parking space.

The parking space determining module 406 is configured to determine a second parking space as the target parking space automatically, The first driving control module 402 is further configured to control the vehicle to drive into the second parking space.

In some embodiments, the second driving control module 404 is configured to: determine whether an obstacle exists within a predetermined range of the vehicle while the vehicle is controlled to drive into the first parking space; determine whether there is a moving room that allows the vehicle to avoid the obstacle and drive into the first parking space in response to determining that the obstacle exists; and determine that the vehicle fails to drive into the first parking space in response to determining that there is no moving room.

Figure 5:
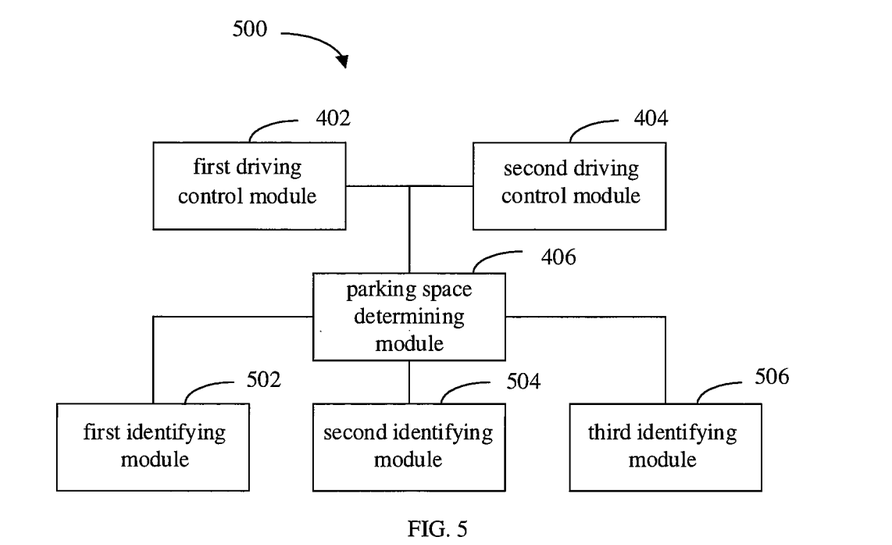
FIG. 5 is a block diagram illustrating an apparatus for controlling a vehicle according to a fourth embodiment of the present disclosure.

FIG. 5 is a block diagram illustrating an apparatus 500 for controlling a vehicle according to a fourth embodiment of the present disclosure. As illustrated in FIG. 5, comparing with the apparatus 400, the apparatus 500 further includes a first identifying module 502, a second identifying module 504, and a third identifying module 506.

In some embodiments, the first identifying module 502 is configured to identify a state of at least one parking space adjacent to the first parking space while the vehicle is controlled to drive into the first parking space. The first identifying module 502 is further configured to identify the state of the at least one parking space adjacent to the first parking space while the vehicle is reversing along a lane. The parking space determining module 406 is further configured to determine the at least one parking space as at least one candidate parking space in response to the at least one parking space being in the idle state.

In some embodiments, the second identifying module 504 is configured to identify a state of the first parking space while the vehicle is driving along a lane. The parking space determining module 406 is further configured to determine the first parking space as the target parking space in response to the first parking space being in the idle state.

In some embodiments, the second identifying module 504 is further configured to identify a state of at least one parking space adjacent to the first parking space while identifying the state of the first parking space. The parking space determining module 406 is further configured to determine the at least one parking space as at least one candidate parking space in response to the at least one parking space being in the idle state.

In some embodiments, the parking space determining module 406 is further configured to determine the second parking space from the at least one candidate parking space as the target parking space.

In some embodiments, the third identifying module 506 is configured to identify environment information of the at least one candidate parking space while the vehicle is controlled to drive away the first parking space. The parking space determining module 406 is further configured to determine the second parking space from the at least one candidate parking space as the target parking space based on the environment information.

In some embodiments, the second identifying module 504 is further configured to identify the state of the second parking space adjacent to the first parking space while the vehicle is controlled to drive away the first parking space and drive along a lane. The parking space determining module 406 is further configured to determine the second parking space as the target parking space in response to the second parking space being in the idle state.

According to embodiments of the present disclosure, when the vehicle encounters the obstacle and fails to drive into the parking space during driving into the parking space, another parking space is automatically determined, thereby realizing the autonomous parking again. In this way, the vehicle may be parked to the parking space autonomously, to ensure the effect of the autonomous parking.

Figure 6:
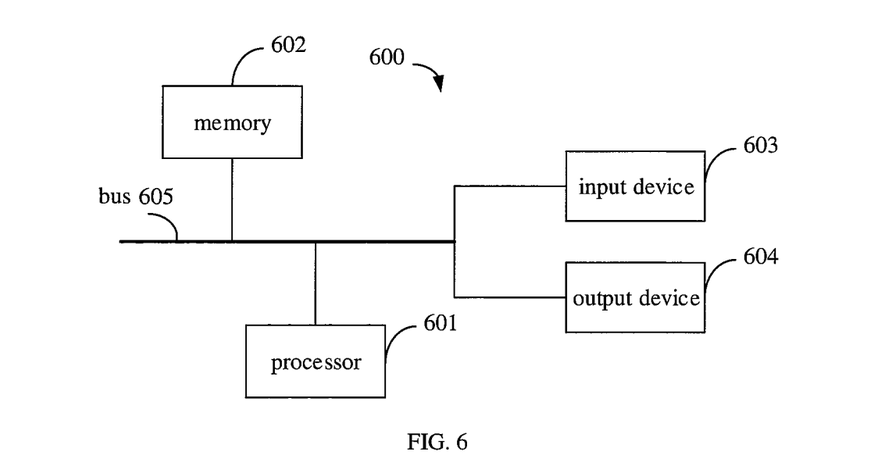
FIG. 6 is a block diagram illustrating an electronic device capable of implementing a method for controlling a vehicle according to embodiments of the present disclosure.

According to embodiments of the present disclosure, the present disclosure also provides an electronic device and a readable storage medium. FIG. 6 is a block diagram illustrating an electronic device 600 capable of implementing a method for controlling a vehicle according to embodiments of the present disclosure.

The electronic device aims to represent various forms of digital computers, such as a laptop computer, a desktop computer, a workstation, a personal digital assistant, a server, a blade server, a mainframe computer and other suitable computers. The electronic device may also represent various forms of mobile devices, such as a personal digital processing, a cellular phone, a smart phone, a wearable device and other similar computing devices. The components, connections and relationships of the components, and functions of the components illustrated herein are merely examples, and are not intended to limit the implementation of the present disclosure described and/or claimed herein.

As illustrated in FIG. 6, the electronic device 600 includes: one or more processors 601, a memory 602, and interfaces for connecting various components, including a high-speed interface and a low-speed interface. Various components are connected to each other by different buses, and may be mounted on a common main board or mounted in other ways as required. The processor 601 may process instructions executed within the electronic device 600, including instructions stored in or on the memory 602 to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 6, a processor 601 is taken as an example.

The memory 602 is a non-transitory computer readable storage medium provided by the present disclosure. The memory 602 is configured to store instructions executable by at least one processor, to enable the at least one processor to execute a method for controlling a vehicle provided by the present disclosure. The non-transitory computer readable storage medium provided by the present disclosure is configured to store computer instructions. The computer instructions are configured to enable a computer to execute the method for controlling the vehicle provided by the present disclosure.

As the non-transitory computer readable storage medium, the memory 602 may be configured to store non-transitory software programs, non-transitory computer executable programs and modules, such as program instructions/modules (such as, the first driving control module 402, the second driving control module 404, and the parking space determining module 406 illustrated in FIG. 4) corresponding to the method for controlling the vehicle according to embodiments of the present disclosure. The processor 601 executes various functional applications and data processing of the server by operating non-transitory software programs, instructions and modules stored in the memory 602, that is, implements the method for controlling the vehicle according to the above method embodiment.

The memory 602 may include a storage program region and a storage data region. The storage program region may store an application required by an operating system and at least one function. The storage data region may store data created according to usage of the electronic device for controlling a vehicle. In addition, the memory 602 may include a high-speed random access memory, and may also include a non-transitory memory, such as at least one disk memory device, a flash memory device, or other non-transitory solid-state memory devices. In some embodiments, the memory 602 may optionally include memories remotely located to the processor 601, and these remote memories may be connected to the electronic device capable of controlling the vehicle via a network. Examples of the above network include, but are not limited to, the Internet, an intranet, a local area network, a mobile communication network and combinations thereof.

The electronic device capable of implementing the method for controlling the vehicle may also include: an input device 603 and an output device 604. The processor 601, the memory 602, the input device 603, and the output device 604 may be connected through a bus 605 or in other means. In FIG. 6, the bus 605 is taken as an example.

The input device 603 may receive inputted digital or character information, and generate key signal input related to user setting and function control of the electronic device capable of controlling the vehicle, such as a touch screen, a keypad, a mouse, a track pad, a touch pad, an indicator stick, one or more mouse buttons, a trackball, a joystick and other input device. The output device 604 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components, or the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact via the communication network. A relationship between the client and the server is generated by computer programs operated on a corresponding computer and having a client-server relationship with each other.

With the technical solution according to embodiments of the present disclosure, when the vehicle may not successfully drive into the target parking space previously determined during the autonomous parking, another target parking space is automatically determined for re-parking. In this way, it is ensured that the vehicle may be parked in the parking space, and a good effect of the autonomous parking is achieved.

It should be understood that, steps may be reordered, added or deleted by utilizing flows in the various forms illustrated above. For example, the steps described in the present disclosure may be executed in parallel, sequentially or in different orders, so long as desired results of the technical solution disclosed in the present disclosure may be achieved, there is no limitation here.

The above detailed implementations do not limit the protection scope of the present disclosure. It should be understood by the skilled in the art that various modifications, combinations, sub-combinations and substitutions may be made based on design requirements and other factors. Any modification, equivalent substitution and improvement made within the spirit and the principle of the present disclosure shall be included in the protection scope of present disclosure.

What is claimed is:

1. A method for controlling a vehicle, comprising:
   autonomously controlling a vehicle using an electronic device associated with the vehicle to drive into a first parking space, the first parking space being a target parking space determined to be in an idle state;
   autonomously controlling the vehicle using an electronic device associated with the vehicle to stop driving into the first parking space in response to determining there is an obstacle in the first parking space;
   in response to the stop driving into the first parking space determining a second parking space as the target parking space automatically; and
   autonomously controlling the vehicle using an electronic device associated with the vehicle to drive into the second parking space.

2. The method of claim 1, further comprising:
   identifying a state of at least one parking space adjacent to the first parking space while the vehicle is controlled to drive into the first parking space; and
   determining the at least one parking space as at least one candidate parking space in response to the at least one parking space being in the idle state.

3. The method of claim 2, wherein identifying the state of the at least one parking space adjacent to the first parking space comprises:
   identifying the state of the at least one parking space adjacent to the first parking space while the vehicle is controlled to drive in reverse along a lane.

4. The method of claim 1, further comprising:
   identifying a state of the first parking space while the vehicle is controlled to drive along a lane; and
   determining the first parking space as the target parking space in response to the first parking space being in the idle state.

5. The method of claim 4, further comprising:
   identifying a state of at least one parking space adjacent to the first parking space while identifying the state of the first parking space; and
   determining the at least one parking space as at least one candidate parking space in response to the at least one parking space being in the idle state.

6. The method of claim 2, wherein determining the second parking space as the target parking space automatically comprises:
   determining the second parking space from the at least one candidate parking space as the target parking space.

7. The method of claim 2, further comprising:
   identifying environment information of the at least one candidate parking space while the vehicle is controlled to drive away the first parking space.

8. The method of claim 7, wherein determining the second parking space as the target parking space automatically comprises:
   determining the second parking space from the at least one candidate parking space as the target parking space based on the environment information.

9. The method of claim 1, wherein determining the second parking space as the target parking space automatically comprises:
   identifying the state of the second parking space adjacent to the first parking space while the vehicle is controlled to drive away the first parking space and drive along a lane; and
   determining the second parking space as the target parking space in response to the second parking space being in the idle state.

10. The method of claim 1, wherein controlling the vehicle to stop driving into the first parking space in response to determining that the vehicle fails to drive into the first parking space comprises:
    determining whether the obstacle exists within a predetermined range of the vehicle while the vehicle is controlled to drive into the first parking space;
    determining whether there is a moving room that allows the vehicle to avoid the obstacle and
    drive into the first parking space in response to determining that the obstacle exists; and controlling the vehicle to drive away the first parking space in response to determining that there is no moving room.

11. An apparatus for controlling a vehicle, comprising:
    at least one processor associated with the vehicle; and
    a memory, communicatively coupled to the at least one processor, wherein the at least one processor is configured to:
  autonomously controlling vehicle to drive into a first parking space, the first parking space being a target parking space determined to be in an idle state;
  autonomously controlling the vehicle to stop driving into the first parking space in response to determining that there is an obstacle in the first parking space;
  in response to the stop driving into the first parking space determining a second parking space as the target parking space automatically; and
  autonomously controlling the vehicle to drive into the second parking space.

12. The apparatus of claim 11, wherein the at least one processor is further configured to:
  identify a state of at least one parking space adjacent to the first parking space while the vehicle is controlled to drive into the first parking space, and
  determine the at least one parking space as at least one candidate parking space in response to the at least one parking space being in the idle state.

13. The apparatus of claim 12, wherein the at least one processor is further configured to identify the state of the at least one parking space adjacent to the first parking space while the vehicle is controlled to drive in reverse along a lane.

14. The apparatus of claim 11, wherein the at least one processor is further configured to:
  identify a state of the first parking space while the vehicle is controlled to drive along a lane, and
  determine the first parking space as the target parking space in response to the first parking space being in the idle state.

15. The apparatus of claim 14, wherein the at least one processor is further configured to identify a state of at least one parking space adjacent to the first parking space while identifying the state of the first parking space; and
  determine the at least one parking space as at least one candidate parking space in response to the at least one parking space being in the idle state.

16. A non-transitory computer readable storage medium having computer instructions stored thereon, wherein the computer instructions are configured to cause a computer associated with a vehicle to execute a method for controlling vehicle, the method comprising:
  autonomously controlling a vehicle to drive into a first parking space, the first parking space being a target parking space determined to be in an idle state;
  autonomously controlling the vehicle to stop driving into the first parking space in response to determining that there is an obstacle in the first parking space;
  in response to the stop driving into the first parking space determining a second parking space as the target parking space automatically; and
  autonomously controlling the vehicle to drive into the second parking space.

17. The storage medium of claim 16, wherein the method further comprises:
  identifying a state of at least one parking space adjacent to the first parking space while the vehicle is controlled to drive into the first parking space; and
  determining the at least one parking space as at least one candidate parking space in response to the at least one parking space being in the idle state.

18. The storage medium of claim 17, wherein identifying the state of the at least one parking space adjacent to the first parking space comprises:
  identifying the state of the at least one parking space adjacent to the first parking space while the vehicle is controlled to drive in reverse along a lane.

19. The storage medium of claim 16, wherein the method further comprises:
  identifying a state of the first parking space while the vehicle is controlled to drive along a lane; and
  determining the first parking space as the target parking space in response to the first parking space being in the idle state.

20. The storage medium of claim 19, wherein the method further comprises:
  identifying a state of at least one parking space adjacent to the first parking space while identifying the state of the first parking space; and
  determining the at least one parking space as at least one candidate parking space in response to the at least one parking space being in the idle state.

* * * * *